Jan. 15, 1957  J. D. RECTOR ET AL  2,777,981
A.C. TO D.C. CONVERTER
Filed April 5, 1955

INVENTORS
EDGAR H. FRITZE
LEO P. KAMMERER
JOHN D. RECTOR
BY
*Morris Moody*
ATTORNEY United States Patent Office 2,777,981
Patented Jan. 15, 1957

2,777,981

A. C. TO D. C. CONVERTER

John D. Rector, Edgar H. Fritze, and Leo P. Kammerer, Cedar Rapids, Iowa, assignors to Collins Radio Company, Cedar Rapids, Iowa, a corporation of Iowa Application April 5, 1955, Serial No. 499,317

4 Claims. (Cl. 321—8)

This invention relates in general to an A. C. to D. C. converter and in particular to an improved converter for use with a synchro transmitter.

Synchro devices have been used very extensively during the past ten years for developing signals proportional to various functions, as for example, shaft positions. These devices have windings mounted on the stator and rotor and they operate on A. C. signals. They are generally excited by an A. C. voltage applied either to a stator or rotor winding. Output signals are derived from the windings which are not excited by the control voltage. These voltages are induced by transformer action. It is sometimes necessary to change the A. C. signal from the synchro to D. C. The amplitude of D. C. signal becomes proportional to the "error" and the polarity determines the direction of displacement from the zero reference. For example, counter-clockwise rotation might result in a positive D. C. signal with an amplitude proportional to the deviation; whereas, rotation in a clockwise direction might result in a negative signal with an amplitude proportional to the angular deviation.

Structures of the prior art have generally used only two of the three output windings of the synchro. The outputs of these windings have been supplied to a phase detector which receives a reference voltage from the same source that excites the synchro.

It is an object of this invention, therefore, to eliminate two transformers and four windings from the conventional conversion from A. C. to D. C. in synchros.

Another object is to provide an accurate means of converting from A. C. to D. C.

A feature of this invention is found in the provision for utilizing the third control windings on a synchro as a reference voltage and thus eliminate two transformers and four windings conventionally necessary.

Figure 1:
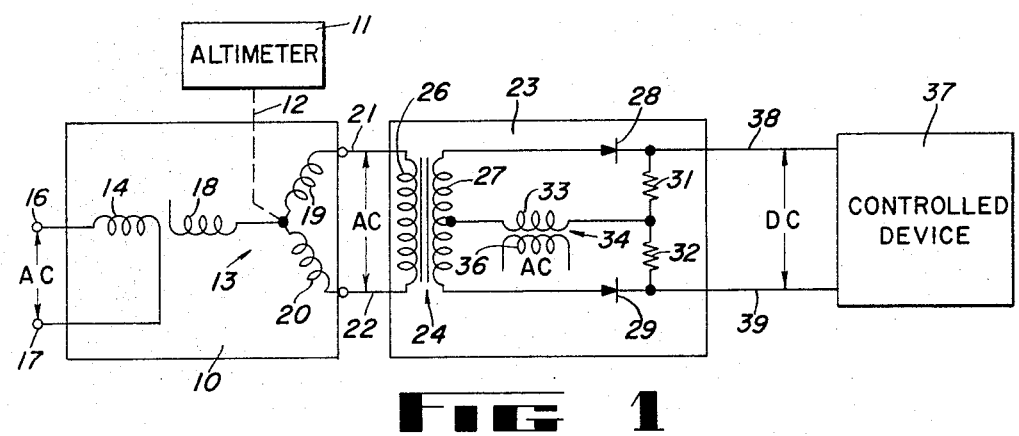
Figure 2:
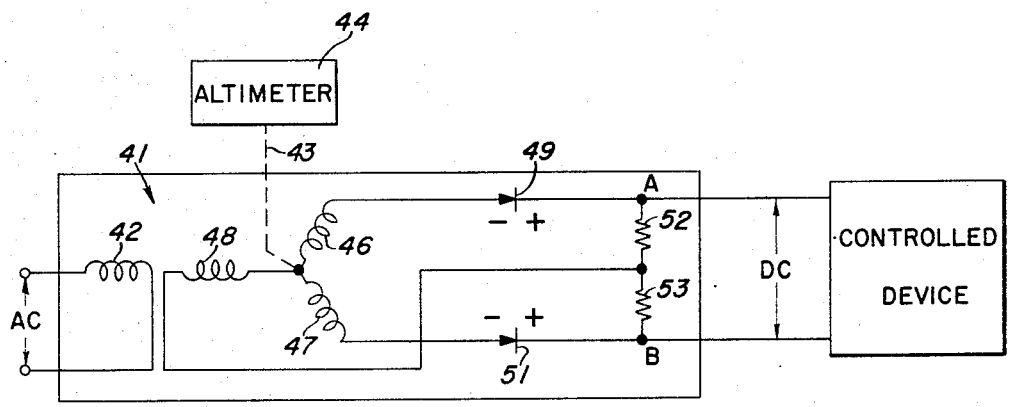

Further objects, features, and advantages of the invention will become apparent from the following description and claims when read in view of the drawings, in which:

Figure 1 illustrates a conventional A. C. to D. C. converter; and,

Figure 2 illustrates the novel converter of our invention.

Referring to Figure 1, a conventional synchro 10 might produce an output indicative of a function. For example, an aircraft altimeter 11 might have an output shaft 12 which is connected to the rotor 13 of the synchro. Variations from a desired altitude rotate shaft 12 and the synchro produces an error signal. It might be desirable to produce a D. C. control voltage for a magnetic amplifier, for example. The synchro 10 has an exciting winding 14 that is connected to input terminals 16 and 17 to which a suitable exciting voltage is applied. For example, if the synchro 10 is mounted on an aircraft, 400 cycles alternating current may be applied from the power supply of the aircraft. There are three windings 18, 19, and 20, mounted 120 degrees apart in a well known manner. The exciting winding 14 may be mounted on the stator or rotor and the output windings are mounted on the other. The shaft 12 is connected to the rotor 13 and is connected to the altimeter 11.

It is to be realized, of course, that the synchro may be driven in response to any desired function.

The windings 18, 19, and 20 are connected in Y fashion, although the principles of the invention are applicable to a delta connected system. Leads 21 and 22 are connected to the ends of windings 19 and 20 and feed into a phase detector 23 which has a first transformer 24 with a primary winding 26. Winding 18 is left open-circuited. Winding 26 is connected to leads 21 and 22. The secondary winding 27 has a first diode 28 connected to one end and a second diode 29 connected to the other end. A pair of resistors 31 and 32 are connected in series between the opposite sides of diodes 28 and 29. The midpoint of the secondary winding 27 is connected to one side of the secondary 33 of a second transformer 34. The other side of the secondary is connected to the junction between the resistors 31 and 32.

A primary exciting winding 36 is connected to the 400-volt power supply of the aircraft and excites the secondary winding 33. The output of the phase detector is a D. C. voltage which has a magnitude proportional to the position of shaft 12 from a zero position and a polarity depending upon the direction of deviation from the zero position.

It might be connected to a magnetic amplifier 37, for example, by leads 38 and 39, so as to obtain a signal with sufficient power to drive a controlled device in response to changes in the altitude of the aircraft.

The present invention is illustrated in Figure 2, wherein the synchro 41 has an exciting winding 42 that is connected to a suitable A. C. source, as for example, 400 cycles A. C. The rotor is driven by shaft 43 which is connected to a suitable control device 44, as for example an altimeter. The three windings 46, 47, and 48 are connected in Y fashion as in Figure 1. One end of winding 46 is connected to a first diode 49, and one end of winding 47 is connected to a second diode 51.

A pair of resistors 52 and 53 are connected in series between the other sides of the diodes 49 and 51. The midpoint between the resistors 52 and 53 is connected to the third winding 48 of the synchro.

The output developed at points A and B across resistors 52 and 53 will be a D. C. voltage with an amplitude proportional to the amount of deviation of the shaft 43 from a zero position and with a polarity that depends upon the direction of rotation of the shaft.

It is to be noted that the diodes 49 and 51 are connected so that they pass current in the same direction. For example, the left side of the diodes would be negative and the right sides would be positive with respect to Figure 2. If the synchro is at the zero position the voltages developed across resistors 52 and 53 will be equal and opposite to give zero output. As the shaft is changed from the zero position this balance will be destroyed so that more voltage is developed across one of the windings, 46 or 47. The voltage across the winding 48 is a reference voltage and since it varies as the cosine of the angle, small changes in shaft position will not appreciably change the voltage developed across it. This relatively constant voltage is used as a reference voltage by connecting it to the midpoint between the resistors 52 and 53.

It is seen that this invention eliminates two transformers 24 and 34 from the conventional apparatus shown in Figure 1.

Although this invention has been described with respect to a particular embodiment thereof, it is not to be so limited as changes and modifications may be made there-

We claim:

1. An error voltage translating means comprising, a movable coil transformer having at least three output terminals, rectifier means connected in like polarity to a plurality of said output terminals, tapped impedance means completing the circuit of said rectifier means external to said transformer, circuit means connecting another of said output terminals to the tap of said impedance means whereby the sum of rectified voltages across said impedance means yields a voltage which indicates by its polarity and amplitude the direction and extent of movement of said moving coil from a reference position.

2. A synchronous error signal translating device comprising, a synchro having an exciting field and three mutually space-related windings with three output potential terminals, the input to said device comprising the position of the exciting field relative to the said three windings, two diodes connected in like polarity to two of said potential points, a resistor completing a series circuit with said diodes across said potential points, and a connection between the midpoint of said resistor and the third potential point, the voltage across said resistor being the output of said device.

3. A mechanical-to-electrical signal translating device yielding a direct voltage signal for a mechanical input comprising, means having shaft positions in rotation, synchro means having a rotor position input, means coupling the rotor of said synchro to said shaft means, the output for said synchro comprising three phase terminal means, a pair of diodes, a first, like terminal of each diode being connected to a separate terminal means of said synchro, impedance means connected between the other terminals of said diodes and a connection from the third phase of said synchro to a tap on said impedance means, whereby the voltage across said impedance means corresponds in polarity and amplitude to the direction and extent of rotation of said shaft from a reference position.

4. An altimeter signal translating device yielding a direct voltage signal comprising, an altimeter having a rotating shaft output, a synchro having an exciting winding, a rotor, and three windings angularly related in space and inductively coupled to said exciting winding, means coupling the rotor of said synchro to said shaft, means connecting the said three windings so as to yield three potential points, a pair of diodes, a first side of each diode being connected in like polarity to a separate potential point, a pair of resistors in series connected between the other sides of said diodes, and a connection from the third potential point to the junction of said pair of resistors, whereby the voltage across the pair of resistors is a direct voltage corresponding in amplitude and polarity to extent of rotation and direction of rotation of the rotating shaft.

References Cited in the file of this patent

UNITED STATES PATENTS

| | | |
|---|---|---|
| 1,844,704 | Thompson | Feb. 9, 1932 |
| 1,939,455 | Livingston | Dec. 12, 1933 |
| 1,955,322 | Brown | Apr. 17, 1934 |
| 2,541,093 | Page | Feb. 13, 1951 |

FOREIGN PATENTS

| | | |
|---|---|---|
| 617,424 | Great Britain | Feb. 7, 1949 |